Dec. 6, 1966     E. G. TROUTMAN ETAL     3,289,671
IONTOPHORESIS METHOD
Filed Sept. 11, 1963     2 Sheets-Sheet 1
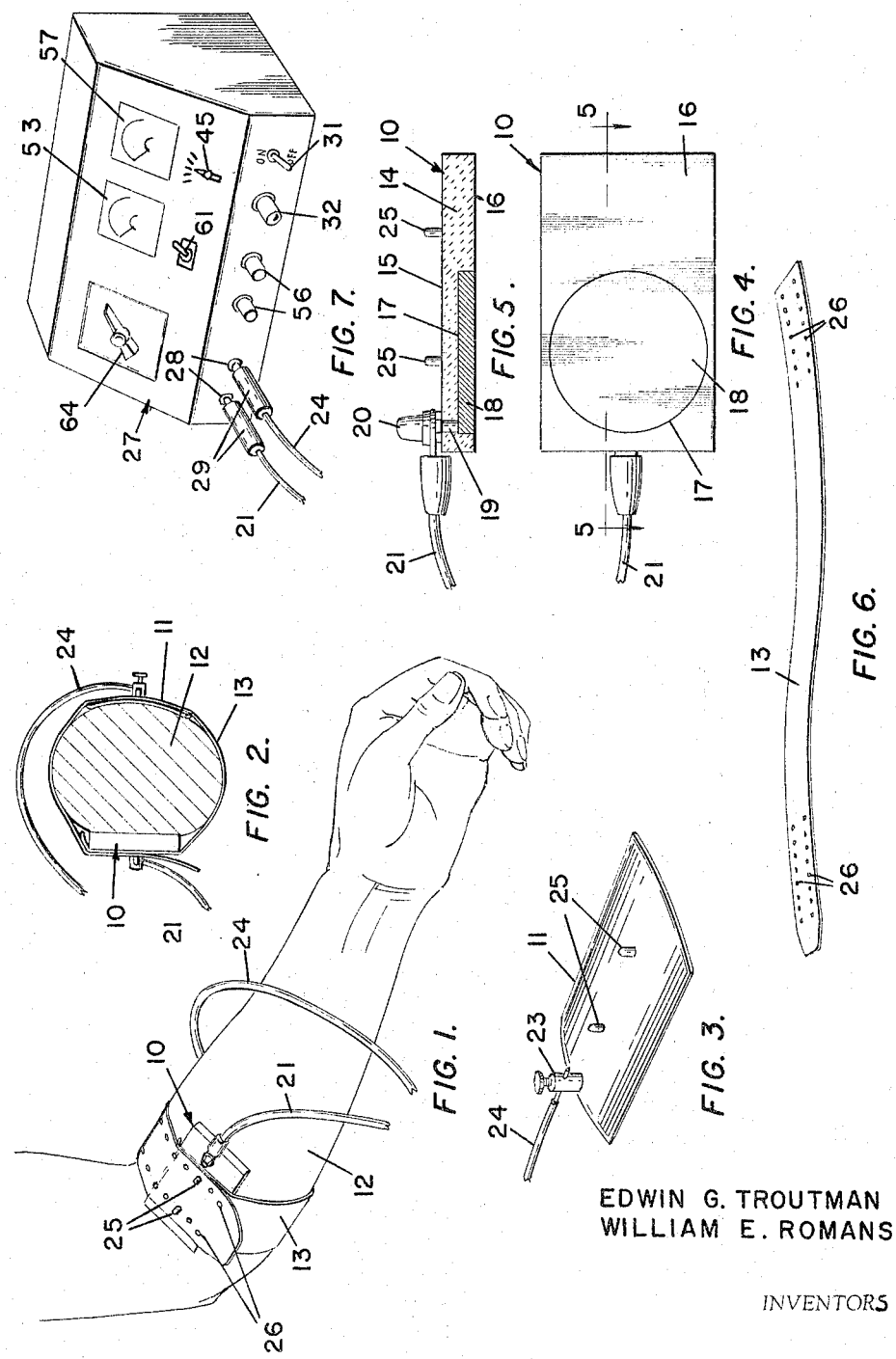
EDWIN G. TROUTMAN
WILLIAM E. ROMANS
INVENTORS
BY Munson H. Lane
ATTORNEY

EDWIN G. TROUTMAN
WILLIAM E. ROMANS
INVENTORS

# 3,289,671
IONTOPHORESIS METHOD

Edwin Glenn Troutman, 1300 W. Cannon St., Fort Worth, Tex., and William E. Romans, 5323 Harry Hines Blvd., Dallas, Tex.
Filed Sept. 11, 1963, Ser. No. 308,178
2 Claims. (Cl. 128—2.1)

This invention relates to new and useful improvements in iontophoresis method, and in particular the invention concerns itself with iontophoresis for obtaining samples of sweat for analytical purposes.

In accordance with conventional practice, iontophoresis is usually carried out by applying a positive and a negative electrode to opposite sides of a body member, such as the forearm, for example, one electrode resting on an absorbent pad which is applied to the skin and saturated with a liquid drug, such as pilocarpine, for example, so that when electric current is applied to the electrodes, ions of the drug pass from one electrode into the skin and toward the other electrode. The direction of passage of the drug is related to the polarity of the electrodes and the ionic charge of the drug's molecule. The amount of the drug which passes into the skin is proportional to the strength of the current and the length of time the current is applied. The iontophoresis with a sweat stimulating drug produces immediate sweating of the sweat glands in the skin under the drug-saturated pad of the electrode, and the resistance to the flow of current between the electrodes varies directly in proportion to the amount of sweat secreted and the extent of its concentration in the electrolyte constituted by the mixture of the sweat and the drug.

In conventional iontophoresis practice constant voltage is applied to the electrodes, and it therefore follows that as sweating occurs the electrolyte from the sweat produces variations in resistance to the flow of current and consequently current strength, which ultimately result in variations in the amount of the drug introduced into the skin during a given period of time. Inasmuch as it is essential for purposes of accurate analysis that the amount of sweat secreted be quantitatively coordinated with the amount of drug introduced, the aforementioned variations incident to conventional iontophoresis are obviously detrimental.

It is, therefore, the principal object of the invention to eliminate this detriment and facilitate proper coordination of the drug and sweat quantities, this being attained by the provision of means whereby the strength of current flowing between the electrodes remains constant regardless of any variations in the resistance therebetween, so that the drug passes into the skin at a constant rate and the quantity of the drug introduced into the skin during a given period of time may be accurately determined and coordinated with the amount of sweat secreted.

Other objects, features and advantages of the invention will become apparent from the following description taken in conjunction with the accompanying drawings, wherein like reference characters are used to designate like parts, and wherein:

FIGURE 1 is a fragmentary perspective view showing the electrode application to the forearm;

FIGURE 2 is a cross-sectional view of the forearm with the electrodes and electrode retaining band applied thereto;

FIGURE 3 is an enlarged perspective view of the negative electrode;

FIGURE 4 is an underside plan view, on an enlarged scale, of the positive electrode;

FIGURE 5 is a longitudinal sectional view, taken substantially in the plane of the line 5—5 in FIGURE 4;

FIGURE 6 is a perspective view of the electrode retaining band per se in its open position;

FIGURE 7 is a perspective view of a console which houses the constant current generator of the invention with its associated controls and electrode connections.

Figure 8:
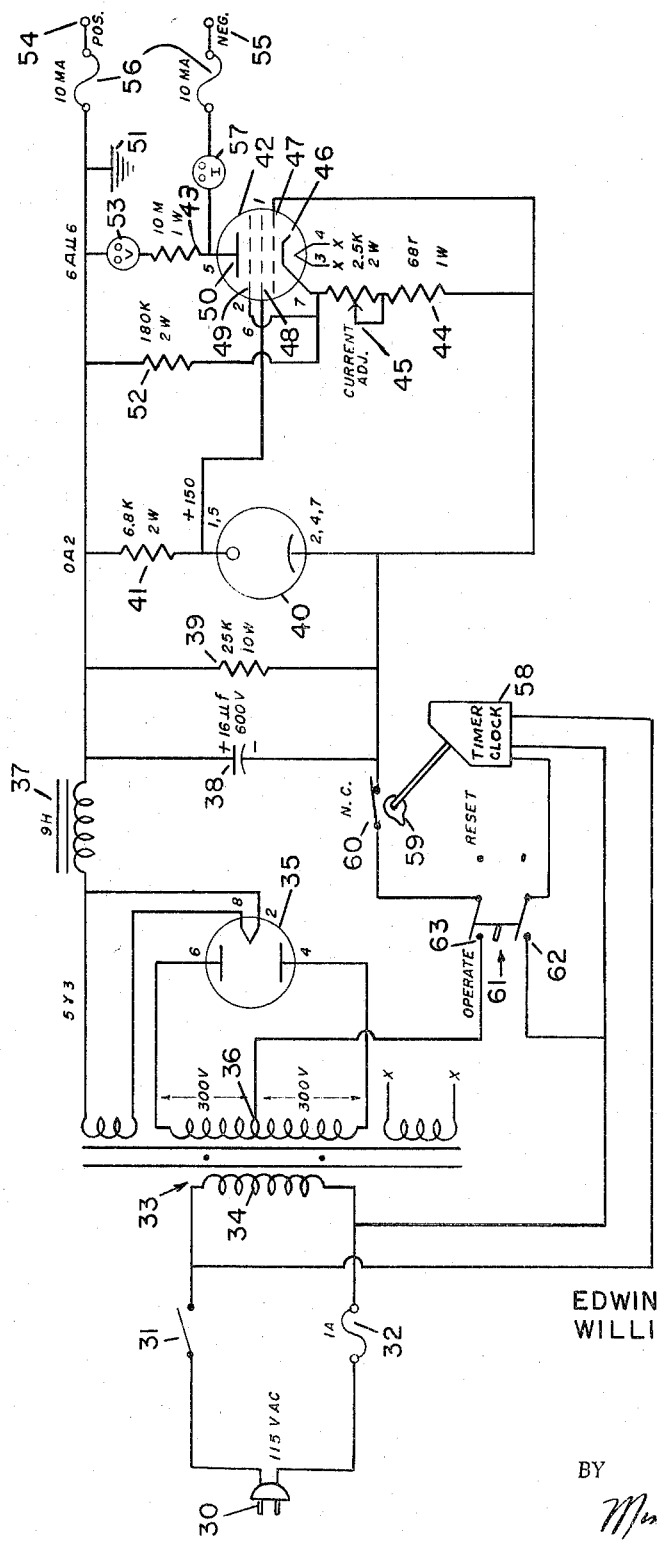
FIGURE 8 is a wiring diagram of the constant current generator.

Referring now to the accompanying drawings in detail, more particularly to FIGURES 1–6 inclusive, the iontophoresis apparatus of the invention is particularly adapted for obtaining samples of sweat for analytical purposes. On the basis of such sweat analysis, for example, it may be determined whether a patient is suffering from mucoviscidosis, a disease involving cystic fibrosis of the pancreas as well as changes in other organs, such as the sweat glands.

The apparatus includes a pair of electrodes, namely, a positive electrode 10 and a negative electrode 11, which are applied to opposite sides of a patient's forearm 12 and are held in position thereon by a retaining band 13. The positive electrode 10 comprises a plate 14 of suitable, electrically nonconductive material such as plastic, or the like, the plate 14 preferably being somewhat elongated and having an upper or outer surface 15 and a lower or inner surface 16, this orientation being related to the position of the plate when applied to the forearm. The lower surface 16 of the plate is formed with a circular recess 17 in which is press-fitted or otherwise suitably mounted a disc-like insert 18 of electrically conductive material such as brass, or the like. A terminal post 19 extends from the insert 18 through the plate 14 and is provided at the upper surface 15 of the plate with an insulated nut 20, whereby a flexible conductor or wire 21 may be electrically connected to the electrode insert 18, as will be readily apparent.

The negative electrode 11 is in the form of a metallic plate 22 provided on its upper or outer surface with a terminal 23 for connection of a flexible conductor 24 thereto.

Both plates 14, 11 of the respective positive and negative electrodes are provided at their upper surfaces with pairs of upstanding keeper pins 25 which are selectively receivable in pairs of apertures 26 formed in the end portions of the aforementioned retaining band 13. As will be apparent, the band is flexible so that it may be wrapped around the forearm after the electrodes have been placed against the forearm, and when the pins 25 of the electrodes are inserted in selected of the apertures 26, the band will effectively hold the electrodes in place.

In applying the electrodes to the forearm, the positive electrode 10 is preferably placed on the inside or the volar surface of the forearm, while the negative electrode 11 is positioned on the relatively opposite or outer surface of the arm.

An absorbent pad of gauze, or the like, (not shown) is saturated with a suitable drug such as pilocarpine hydrochloride which stimulates secretion of sweat when introduced into the skin. This pad is interposed between the skin and the positive electrode 10 in contact with the metallic insert 18, so that when current is applied to the electrodes, ions of pilocarpine in the pad, being positively charged, move toward the negative electrode 11, passing into the sweat glands and stimulating secretion of sweat therefrom. Pilocarpine hydrochloride having a strength of approximately 0.2% has been found satisfactory.

For purposes of good conductivity, a similar pad of gauze, or the like (also not shown) is interposed between the skin and the negative electrode 11, such a pad being saturated with a saline solution such as sodium chloride. A solution strength of 0.9% has been found satisfactory for this purpose.

The current applied to the electrodes 10, 11 is a direct current of a constant strength. A current of two milliamperes applied for a period of two minutes has been found to provide the optimal stimulation. Such current is produced by a constant current generator which maintains the desired current strength regardless of any variations in resistance to current flow between the electrodes, so that the amount of pilocarpine introduced into the skin during a given period may be accurately determined and coordinated with the amount of sweat secreted. The constant current generator, hereinafter more particularly described in connection with the diagrammatic illustration in FIGURE 8, is housed in a suitable console 27 shown in FIGURE 7, it being noted that the console is provided with sockets 28 for reception of suitable connectors 29 at the ends of the conductors 21, 24, for application of current to the electrodes 10, 11.

After the iontophoresis is completed, the area of the forearm which was covered by the pilocarpine-saturated pad is washed lightly with distilled water, dried lightly with cotton, and covered by an ashless filter paper which corresponds substantially to the size of the electrode insert 18. The filter paper is held in place in a suitable manner, such as by a watch glass, for approximately ten minutes, whereupon it is discarded and a similar filter paper from a tared evaporation-proof container is substituted for the first filter paper under a clean watch glass. The second filter paper is removed after a second ten-minute period and is placed in its evaporation-proof container for weighing, dilution with distilled water and analysis, with the amount of sweat collected being determined by the difference in weight of the filter paper before and after its application to the area of iontophoresis. The sweat diluted with distilled water is drawn into a pipet having two electrodes therein, where the conductivity of the solution may be measured with an alternating current Wheatstone bridge. Successive sweat samples may be collected in a similar manner as desired.

The constant current generator shown in FIGURE 8 will now be described.

Power for the constant current generator is supplied from a standard 115 volt, 60 cycle house current supply by means of a cord and plug connector 30. A single pole on-off switch 31 is connected in one side of the line, and a fuse 32 of suitable amperage is connected on the other side of the line between the plug connector 30 and the primary winding 34 of voltage supply transformer 33.

The alternating current from the house supply is converted to filtered D.C. current by means of a standard full wave rectifier tube 35 and a single stage choke input filter comprising choke coil 37, capacitor 38 in series circuit with the rectifier tube 35, and a loading resistor 39 connected across the capacitor 38.

The polarity of rectified power supply is indicated by the polarity markings on opposite sides of the capacitor 38. The upper side of the capacitor 38 is positive and the lower side of the capacitor 38 is negative. The positive side of the rectified power supply is connected to ground 51.

A gas regulator tube 40 (0A2 or other suitable type) is connected in series with a resistor 41 across the loading resistor 39. The gas regulator tube 40 in conjunction with resistor 41 supplies a regulated voltage to the screen grid of a current regulating pentode tube 42.

The current regulating pentode tube 42 (a 6AU6 or other suitable pentode) is connected across the rectified power supply in series with plate resistor 43 and a cathode resistor network comprising fixed resistor 44 and an adjustable, current-adjust resistor 45.

The pentode tube 42 comprises a cathode 46, grid 47, screen grid 48, suppressor grid 49 and plate 50. The cathode 46 is connected through resistors 45 and 44 to the negative side of the rectified power supply. The control grid 47 is connected directly to the negative side of the rectified power supply. The screen grid 48 is connected to the junction of gas regulator tube 40 and resistor 41 and is supplied with a constant positive voltage. The suppressor grid 49 is connected to cathode 46 and through a resistor 52 to the positive side of the rectified power supply. The plate 50 is connected through plate resistor 43 and a voltmeter 53 in series to the positive side of the rectified power supply.

The grid bias of the pentode 42 is varied with current-adjust resistor 45 in the cathode circuit. The current adjust resistor 45 is part of a voltage divider circuit which establishes a minimum voltage for bias so that the pentode 42 cannot draw too much current.

Positive terminal 54 and negative terminal 55 from the constant current source are connected respectively to the grounded positive side of the rectified power supply and to the plate 50 of the pentode 42. The terminals 54 and 55 are connected in the sockets 28 (FIGURE 7) of the console 27. Two 10 milliampere fuses 56 are provided in the positive and negative terminal leads for reason of patient safety. A voltage meter 53 in the plate circuit of pentode 42 and a current meter 57 in the negative terminal lead are provided so that the voltage and current in the patient leads can be monitored. The fuses 32 and 56 are suitably mounted on the face of the console 27 so that they can be readily replaced (FIGURE 7). Also mounted on the console face are the on-off switch 31, the control knob for the current-adjust resistor 45, and the meters 53 and 57.

A timer 58 is provided to time the application of current to the patient and is connected so that voltage is applied and removed slowly by way of the filter capacitor 38.

The timer 58 (shown in box form) is a commercial timer of the type including a constant speed synchronous motor drive. The motor (not shown) drives an output shaft at a constant speed through the usual clock works. An electromagnetic clutch (not shown) is interposed in the output drive between the motor and a switch operating cam 59, which controls the normally closed timing switch 60.

The timer motor runs at a constant speed as soon as the on-off switch 31 is turned on. The electromagnetic clutch is energized through the bottom contact set 62 of the operate-reset switch 61 and is connected across the A.-C. line. The cam 59 can be set from the front of the console 27 by means of the time set knob 64 to a desired time period. With the timer motor running, and the operate-reset switch thrown to the operate position, the electromagnetic clutch in the timer output drive is energized to drive the cam 59 until it opens the timing switch 60. Suitable stops and overrunning clutch means (not shown) are provided in the cam drive so that the timing cam holds the timer switch open until the operate switch is turned to the reset position. When the operate switch 61 is moved to the reset position the electromagnetic clutch is deenergized, and a spring or other suitable means within the timer returns the cam 59 to its initial setting. The cycle can be repeated by again closing the operate switch 61.

While we have briefly described one type of commercial timer that is suitable for use in the circuit shown in FIGURE 8, other types of commercial timers, mechanical or electrical, can be used which will open the timer switch 60 after a predetermined time interval.

The upper set of contacts 63 of the operate-reset switch 61 are connected to a center tap 36 on the secondary side of the transformer 33 and to the normally closed timing switch 60. As soon as the operate-reset switch is closed in the operate position current begins to flow from the rectifier 35 to charge the filter capacitor 38.

While in the foregoing there has been shown and described the preferred embodiment of the invention, various modifications may become apparent to those skilled in the art to which the invention relates. Accordingly, it is not desired to limit the invention to this disclosure and

What is claimed as new is:

1. A method of obtaining samples of sweat from a body member by iontophoresis, said method comprising the steps of placing on one side of the body member a pad saturated with a liquid capable of stimulating secretion of sweat upon contact with sweat glands, applying a positive electrode to said pad, applying a negative electrode to the relatively opposite side of the body member, and applying an electric current of a constant amperage to said electrodes, whereby said liquid may be introduced into the skin at a constant rate proportionate to the constant current strength.

2. A method of obtaining samples of sweat from a body member by iontophoresis and quantitatively analyzing such samples, said method comprising the steps of placing on one side of the body member a pad saturated with a liquid capable of stimulating secretion of sweat upon contact with sweat glands, applying an electrode to said pad, applying another electrode to the relatively opposite side of the body member, passing an electric current of a constant amperage between said electrodes whereby said liquid may be introduced into the skin at a constant rate proportionate to the constant current strength, removing said pad and said electrodes, weighing a filter paper, placing the filter paper on the area of the body member previously occupied by said pad whereby the filter paper may absorb a quantity of sweat secreted, and again weighing the filter paper to determine the sweat quantity.

References Cited by the Examiner

UNITED STATES PATENTS

| | | | |
|---|---|---|---|
| 542,459 | 7/1895 | Beckwith | 128—416 X |
| 562,765 | 6/1896 | Horton | 128—418 X |
| 2,447,127 | 7/1948 | Landauer | 128—417 X |
| 2,684,670 | 7/1954 | Mathison | 128—2.1 |
| 2,784,715 | 3/1957 | Kestler | 128—172.1 |
| 2,812,757 | 11/1957 | Lusk et al. | 128—2 |
| 2,978,084 | 4/1961 | Vilkaitis | 128—418 X |

RICHARD A. GAUDET, *Primary Examiner.*

SIMON BRODER, *Examiner.*